(12) United States Patent
Mummigatti et al.

(10) Patent No.: US 10,449,670 B2
(45) Date of Patent: Oct. 22, 2019

(54) EVENT PROCESSING USING ROBOTIC ENTITIES

(71) Applicant: Bank of America Corporation, Charlotte, NC (US)

(72) Inventors: Vinaykumar Mummigatti, Charlotte, NC (US); Vinoth Sridharan, Waxhaw, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 193 days.

(21) Appl. No.: 15/651,982

(22) Filed: Jul. 17, 2017

(65) Prior Publication Data

US 2019/0015974 A1 Jan. 17, 2019

(51) Int. Cl.
| | | |
|---|---|---|
| *G06F 3/00* | (2006.01) | |
| *B25J 9/16* | (2006.01) | |
| *G06F 16/951* | (2019.01) | |
| *G06F 9/54* | (2006.01) | |

(52) U.S. Cl.
CPC .............. *B25J 9/16* (2013.01); *G06F 9/542* (2013.01); *G06F 16/951* (2019.01)

(58) Field of Classification Search
CPC ....................................................... G06F 9/542
USPC ........................................................ 719/318
See application file for complete search history.

(56) References Cited

U.S. PATENT DOCUMENTS

| | | | |
|---|---|---|---|
| 5,583,758 A | 12/1996 | Mcilroy et al. | |
| 5,616,899 A | 4/1997 | Recigno et al. | |
| 5,634,039 A | 5/1997 | Simon et al. | |
| 5,928,365 A | 7/1999 | Yoshida et al. | |
| 6,006,019 A | 12/1999 | Takei et al. | |
| 6,493,717 B1 | 12/2002 | Junkin | |
| 6,735,448 B1 | 5/2004 | Krishnamurthy et al. | |
| 6,782,402 B1 | 8/2004 | Hidaka et al. | |
| 7,028,228 B1 | 4/2006 | Lovy et al. | |
| 7,051,044 B1 | 5/2006 | Fera et al. | |
| 7,194,526 B2 | 3/2007 | Kanemitsu | |
| 7,197,561 B1 | 3/2007 | Lovy et al. | |
| 7,379,731 B2 | 5/2008 | Natsuno et al. | |
| 7,526,434 B2 | 4/2009 | Sharp | |
| 7,613,752 B2 | 11/2009 | Prahlad et al. | |
| 8,776,050 B2 | 7/2014 | Plouffe et al. | |
| 9,195,233 B2 | 11/2015 | Perrone | |
| 9,555,544 B2 | 1/2017 | Bataller et al. | |
| 9,817,967 B1* | 11/2017 | Shukla | G06F 21/52 |
| 2007/0208442 A1 | 9/2007 | Perrone | |

(Continued)

OTHER PUBLICATIONS

Dongho Kang, A Rule Based Event Correlation Approach for Physical and Logical Security Convergence. (Year: 2012).*

*Primary Examiner* — Lechi Truong

(74) *Attorney, Agent, or Firm* — Michael A. Springs; Moore & Van Allen PLLC; James C. Edwards

(57) ABSTRACT

A system for processing event cases through the use of a robotic process automation (RPA) bot model in conjunction with an event case processing management module is provided. A synergistic processing management and robotic framework provides for end-to-end monitoring and tracking of event case processing performance. In addition the invention provides for data-centric robotics, policy and procedure robotics which manage end-to-end orchestration to provide a holistic throughput of event case processing.

17 Claims, 6 Drawing Sheets

(56) References Cited

U.S. PATENT DOCUMENTS

2008/0307526 A1* 12/2008 Chung ............... H04L 63/1416
                                                    726/23
2017/0052824 A1   2/2017 Sharma et al.

* cited by examiner

EVENT PROCESSING USING ROBOTIC ENTITIES

FIELD OF THE INVENTION

The present invention is generally directed to computer processing and, more specifically implementing robotic process automation (RPA) bots in conjunction with an event case processing management model to process event cases.

BACKGROUND

Event case processing can be a protracted process that entails many repetitive tasks. Processing of such events entails event intake, setup of event case processing, routing of the event case processing for validation and resolution and updating of the event case file.

Robotic software applications, commonly referred to as "bots" are software applications that run automated tasks (scripts). Typically, bots perform tasks that are both simple and structurally repetitive, at a much higher rate than would be possible for a human alone.

Therefore a need exists to further automate the processing of event cases so as to reduce the amount of manual input, decrease turnaround time and add requisite efficiency to result in an automated end-to-end process for processing and managing the processing of event cases.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention provide a comprehensive end-to-end system for managing and processing event cases. The present invention combines a semi-automated event case processing management model with a robotic processing model to result in a more efficient means for processing and managing the event cases. In this regard, the present invention seamlessly interconnects the event case processing management model with use of robotic process automation (RPA) bots to perform laborious activities. By interconnecting the event case processing management model with the robotic processing module the present invention creates higher value from an automation standpoint as well as process orchestration and monitoring. In this regard, the interplay between the event case processing management model and the RPA bot model provides a synergistic approach to monitoring the overall event case process by tracking all of the tasks performed by the RPA bots, such that the system has dynamic knowledge as to how much time is being spent performing a task, and/or adherence to predetermined rules, regulations, policies and service levels. In accordance with embodiments of the invention, event case processing provides the ability to provide dynamic visibility into what stage the processing is currently occurring, i.e., which robotic task is currently occurring and the performance efficiency of the robotic task.

Moreover, in addition to automating simplistic tasks, such as data-centric activities (i.e., uploading and capturing of data and the like) the present invention provides for intelligent determination and validation of procedures, rules, policies and the like applicable to an event. In this regard, the present invention provides a holistic approach to managing, end-to-end, the orchestration of event case processing.

A system for event case processing defines first embodiments of the invention. The system includes a first computing apparatus including a first computing platform having a first memory and at least one first processor in communication with the memory. The system further includes an event detection module stored in the first memory, executable by the first processor and configured to implement predetermined event rules to detect events associated with first entities.

The system further includes a second computing apparatus including a second computing platform having a second memory and at least one second processor. In addition, the system includes an event case processing management module stored in the second memory, executable by the second processor and triggered, by detection of the events by the event detection module, to orchestrate the process and manage the state of event cases.

Additionally, the system includes a third computing apparatus including a third computing platform having a third memory and at least one third processor. In addition, the system includes one or more robotic process automation (RPA) bots stored in the third memory, executable by the third processor and configured to receive an input command from the event case processing management module, perform predetermined robotic tasks in response to the input commands, and return outputs to the event case processing management module in response to performing the predetermined robotic tasks.

In specific embodiments of the system, the event case processing management module and one or more RPA bots are configured to, in unison, provide end-to-end monitoring and performance indication of the processing of the event cases. In such embodiments of the system, the end-to-end monitoring may include (i) tracking and recording all actions performed by the RPA bots, and/or (ii) tracking and monitoring times for each individual task included in the processing of an event case and/or (iii) assessing predetermined service level performance on an ongoing dynamic basis during the processing of an event case.

In still further specific embodiments of the system, the event case processing management module is further configured to provide real-time visibility to a status of the processing of an event case.

In additional specific embodiments of the system, the one or more RPA bots include a data-centric RPA bot configured to capture and upload data associated with the event case. In other embodiments of the system, the one or more RPA bots include a policy and rule validation RPA bot configured to determine one or more policies or rules to apply to the processing of the event case based on a type of the event case and insure that the processing of the event case adheres to the one or more policies or rules. In still further embodiments of the system, the one or more RPA bots include a procedure validation RPA bot configured to determine procedures associated with the processing of the event case based on a type of the event and insure that the processing of the event case adheres to the procedures.

Moreover, in further specific embodiments of the system, the event is further defined as suspicious activity within a system of record associated with the first entities.

A computer program product for event case processing defines second embodiments of the invention. The computer program product includes at least one non-transitory computer readable medium having computer-readable program code portions embodied therein. The computer-readable program code portions include an executable portion for detecting events associated with first entities based on predetermined event detection rules and an executable portion, triggered by detection of the events, for orchestrating the process and managing the state of event cases. The computer-readable program code additionally includes an executable portion, configured to receive an input command for performing one or more predetermined robotic tasks associated with processing the event case, perform the predetermined robotic tasks in response to the input commands, and return outputs in response to performing the predetermined robotic tasks.

In specific embodiments of the computer program product, the computer-readable program code portions further include an executable portion for providing end-to-end monitoring and performance indication of the processing of the event cases. In such embodiments of the computer program product, the executable portion for providing end-to-end monitoring and performance further includes a portion for (i) tracking and recording all actions performed by the RPA bots and/or (ii) tracking and monitoring times for each individual task included in the processing of an event case, and/or (iii) assessing predetermined service level performance on an ongoing basis dynamically during the processing of an event case.

In further specific embodiments of the computer program product, the robotic tasks associated with processing the event case further include determining one or more policies or rules to apply to the processing of the event case based on a type of the event and insuring that the processing of the event case adheres to the one or more policies or rules.

A computer-implemented method for event case processing defines third embodiments of the invention, the method includes detecting events associated with first entities based on predetermined event detection rules, the method further includes triggering, based on the detection of the events, processing orchestration and state management of the event cases. In addition the method includes commanding a RPA bot to perform one or more predetermined robotic tasks associated with processing the event case.

In specific embodiments the method further includes providing end-to-end monitoring and performance indication of the processing of the event cases. In related embodiments of the method, providing end-to-end monitoring and performance indication of the processing of the events further includes (i) tracking and recording all actions performed by the RPA bots, and/or (ii) tracking and monitoring times for each individual task included in the processing of an event case, and/or (iii) assessing predetermined service level performance on an ongoing basis dynamically during the processing of an event case.

Thus, according to embodiments of the invention, which will be discussed in greater detail below, the present invention provides for processing event cases through the use of a RPA bot model in conjunction with an event case processing management module. Such a synergistic framework provides for greater overall efficiency and improved turn-around time. In addition, by implementing robotic processing in combination with an automated, or at least semi-automated, event case processing management, the present invention provides the capability for end-to-end monitoring and tracking of event case processing performance.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
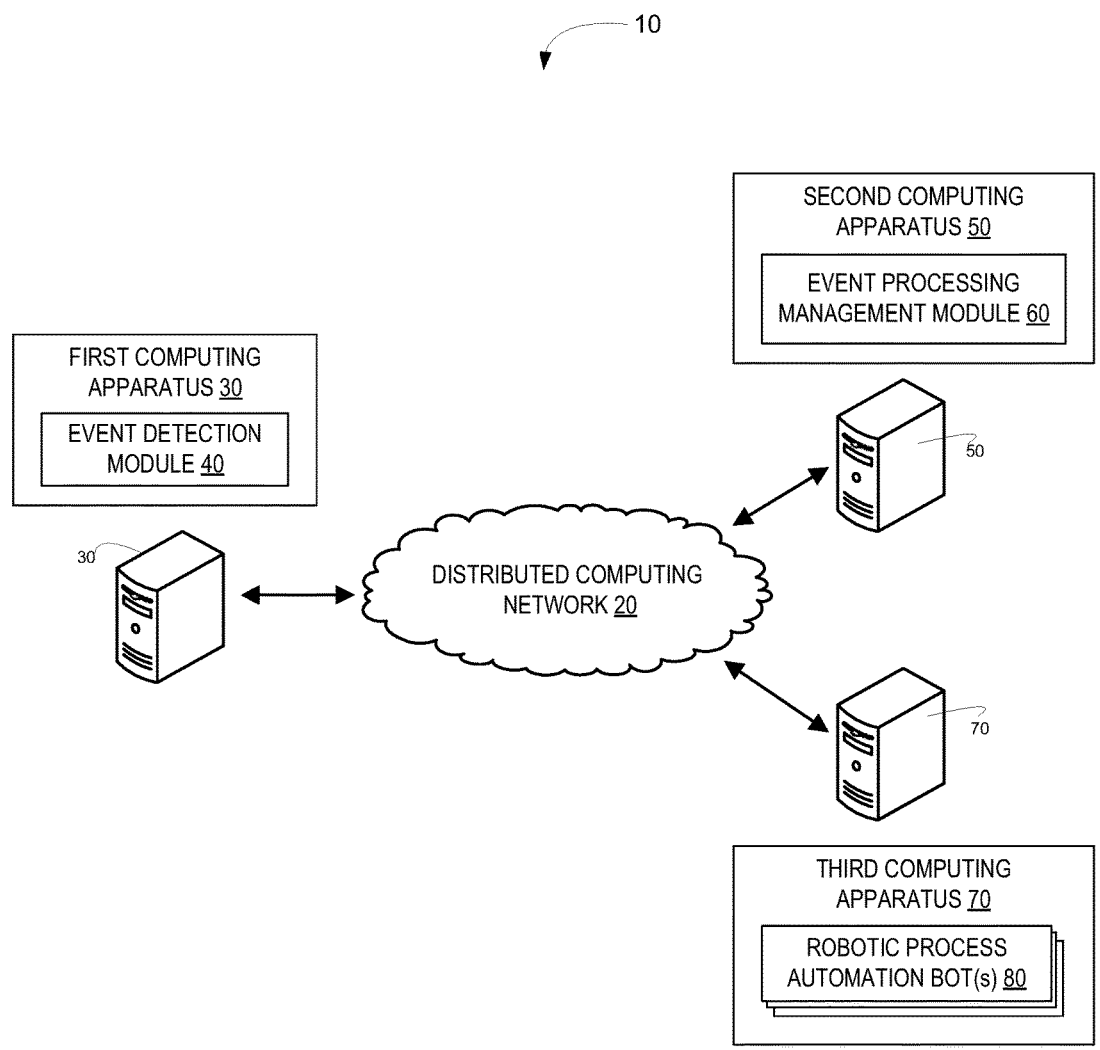
Figure 2:
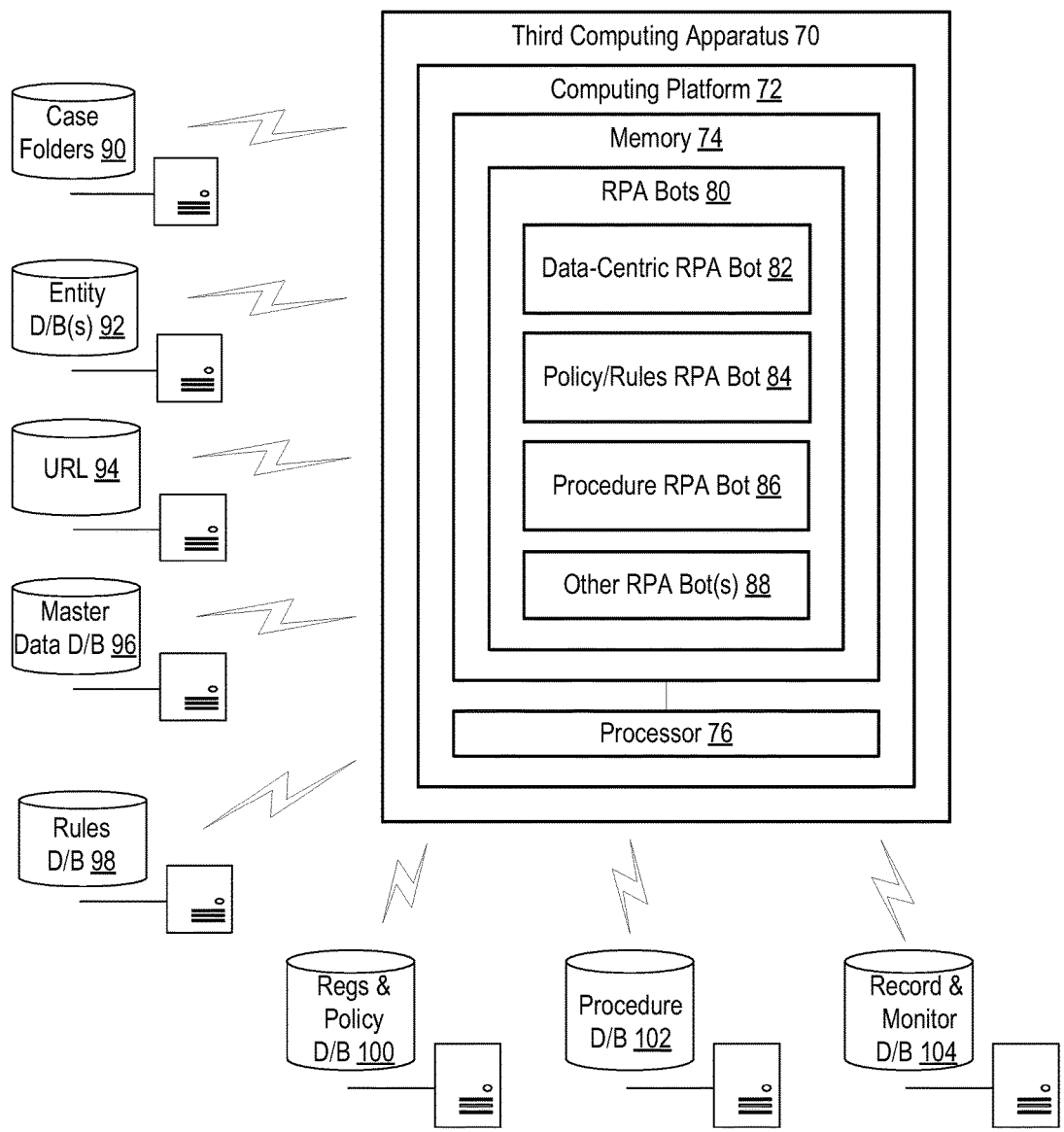
Figure 3:
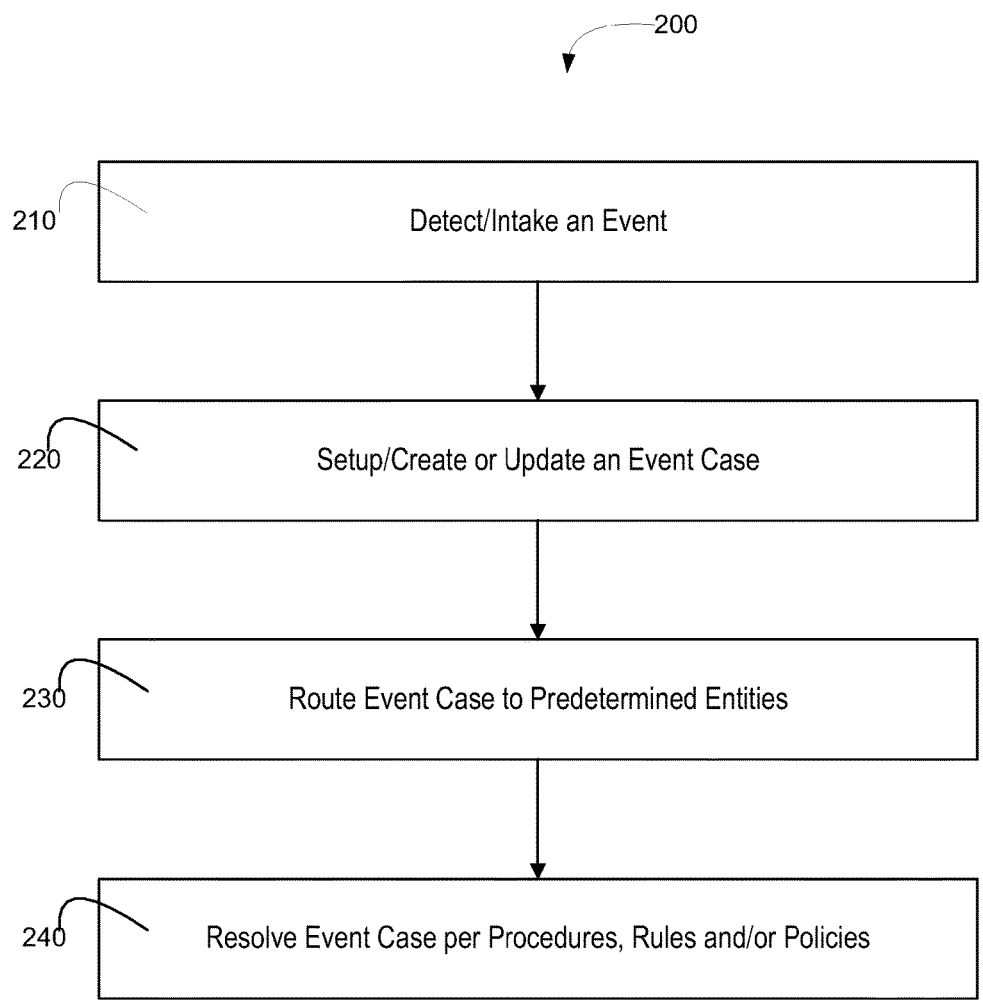
Figure 4:
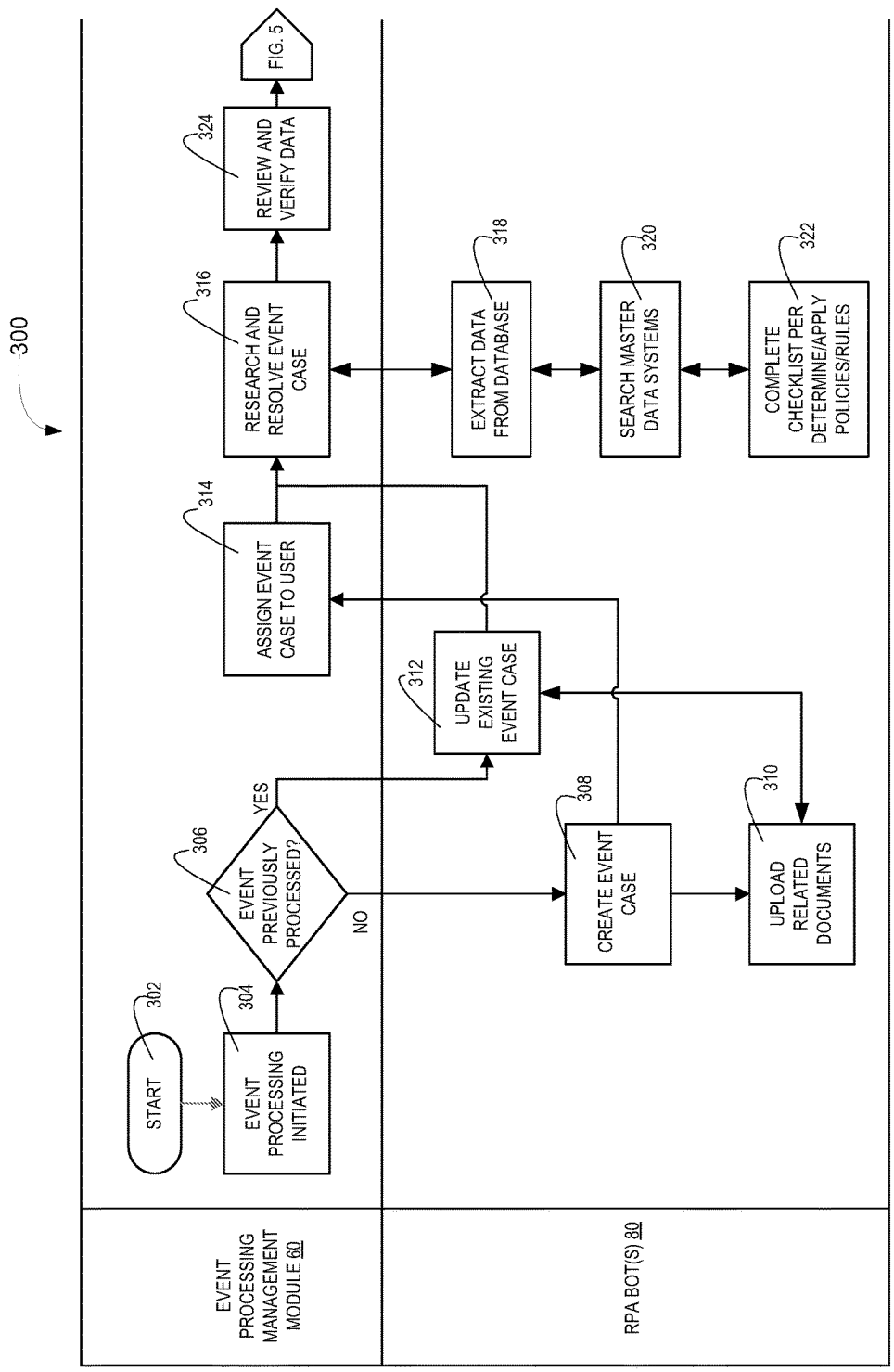
Figure 5:
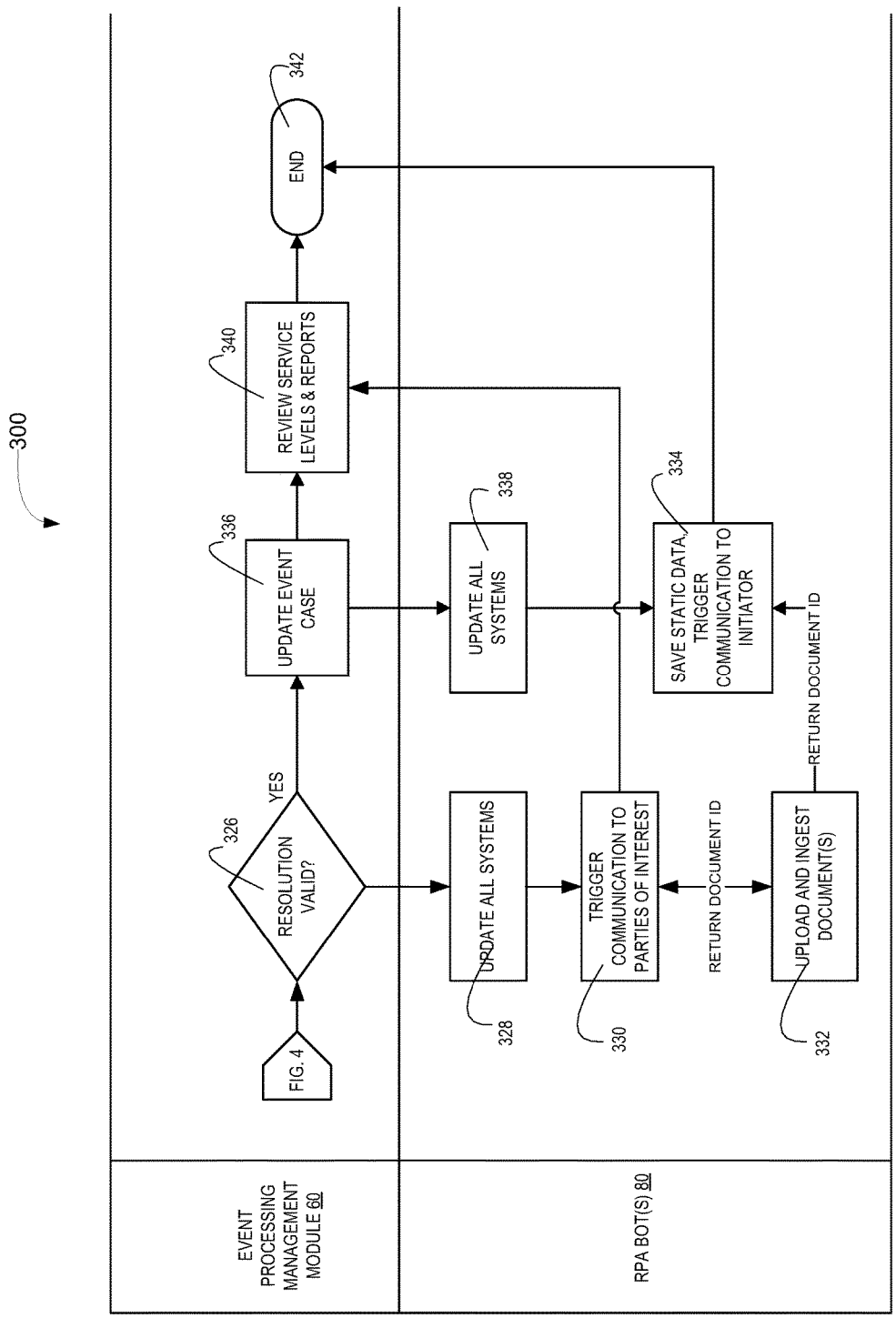
Figure 6:
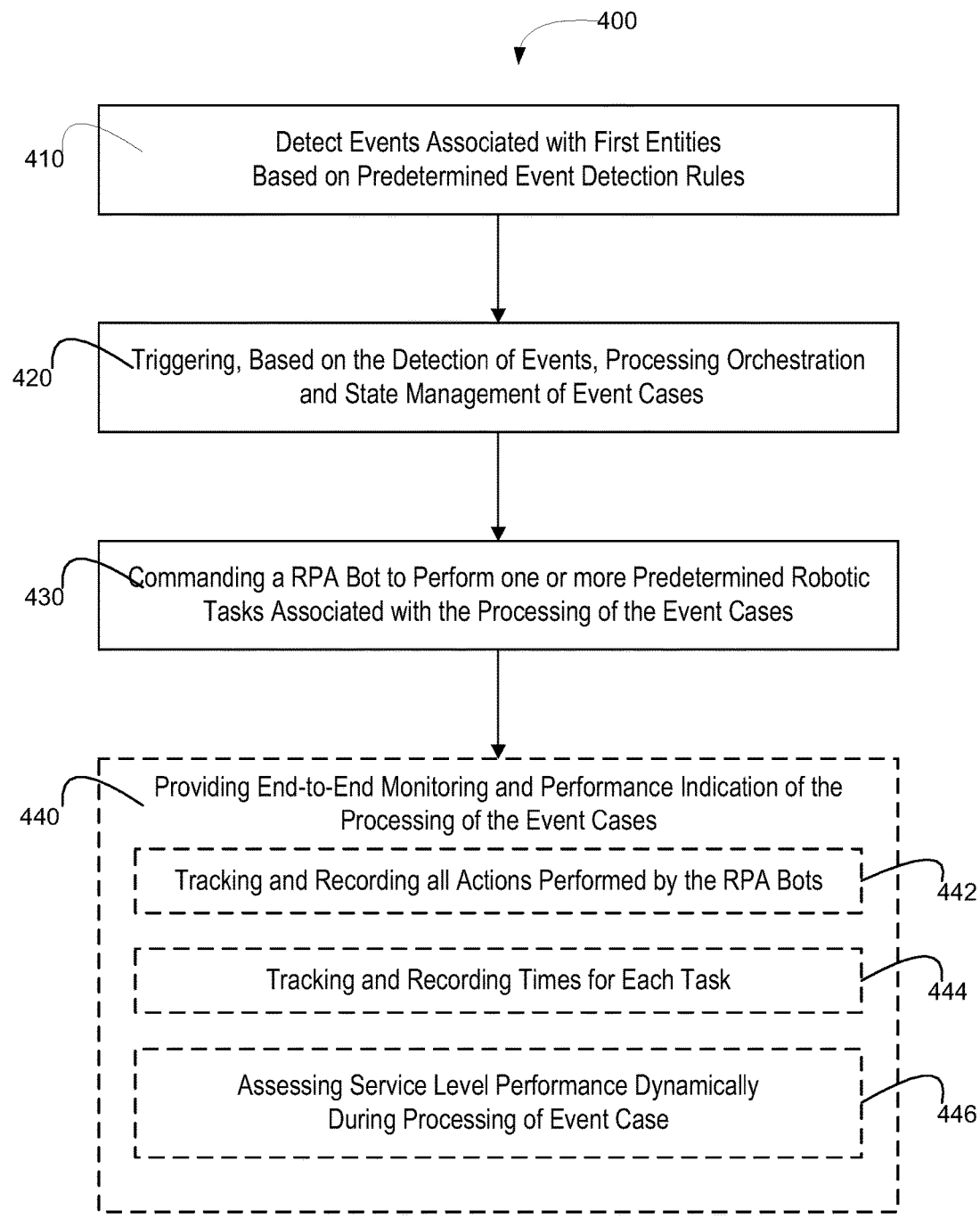

Having thus described embodiments of the invention in general terms, reference will now be made to the accompanying drawings, wherein:

FIG. 1 depicts a system for event case processing using Robotic Process Automation (RPA) bots, in accordance with embodiments of the present invention;

FIG. 2 depicts an apparatus comprising RPA bots configured for performing robotic tasks in conjunction with event case processing, in accordance with embodiments of the present invention;

FIG. 3 depicts a high-level flow diagram of a method for event case processing, in accordance with embodiment of the present invention;

FIGS. 4 and 5 depict a flow diagram of a specific event case process using RPA bots, in accordance with embodiments of the present invention; and FIG. 6 depicts a flow diagram of a method for event case processing using RPA bots, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

A "bot" as used herein may refer to a software application that performs automated tasks. In particular, a plurality of bots may be used by an entity to perform various functions for high-volume applications that relate to the entity's objectives. Typically, a bot will be configured to repeatedly perform a specific task. Each bot may be configured to utilize particular protocols and be compatible with particular platforms and applications. In some embodiments, a bot may be configured to execute its tasks by interacting with other applications within the entity's systems at the interface level (i.e., by providing inputs to the interfaces of the other applications).

Thus, as described in detail below, the present invention provides a comprehensive end-to-end system for managing and processing event cases using Robotic Process Automation (RPA) bots in conjunction with an event case process management model that handles end-to-end process orchestration, state management and real-time visibility to processing status. By combining the event case processing management model with a robotic processing model the present invention results in a more efficient means for processing and managing event cases. In this regard, the present invention seamlessly interconnects the event case processing management model with use of robotic process automation (RPA) bots to perform laborious activities. By interconnecting the event case processing management model with the robotic processing module the present invention creates higher value from an automation standpoint as well as process orchestration and monitoring. In this regard, the interplay between the event case processing management model and the RPA bot model provides a synergistic approach to monitoring the overall event process by tracking all of the tasks performed by the RPA bots, such that the system has dynamic knowledge as to how much time is being spent performing a task, and/or adherence to predetermined rules, regulations, policies and service levels. In accordance with embodiments of the invention, robotic case management provides the ability to provide dynamic visibility into at what stage the processing is currently occurring, i.e., which robotic task is currently occurring and the performance efficiency of the robotic task.

Moreover, in addition to automating simplistic tasks, such as data-centric activities (i.e., uploading and capturing of data and the like) the present invention provides for intelligent determination and validation of procedures, rules, policies and the like applicable to an event case. In this regard, the present invention provides a holistic approach to managing, end-to-end, the orchestration of event case processing.

FIG. 1 is a schematic diagram illustrating a system 10 for robotic event case management, in accordance with embodiments of the present invention. The system 10 is implemented in a distributed computing network 20, such as the Internet, an intranet or a combination of both the Internet and one or more intranets and the apparatus 30, 50, 70 comprising the system 10 may be in wired and/or wireless communication with the distributed computing network 20. The system 10 includes a first computing apparatus 30 having a computing platform including a memory and at least one processor in communication with the memory. The first computing apparatus 30 stores, in the memory, an event detection module 40 that is executable by the processor and configured to implement predetermined event rules to identify or otherwise detect events associated with one or more entities. The term "event" as used herein refers to an item or object that has been identified within a system of record as an anomaly, outlier or the like. In this regard, the "event" potentially poses a problem or issue that requires further investigation and/or resolution. Such further investigation and/or resolution is referred to herein as an "event case" or "case".

The system 10 additionally includes a second computing apparatus 50 having a computing platform including a memory and at least one processor in communication with the memory. The second computing apparatus 30 stores, in the memory, an event case processing management module 60 that is executable by the processor and configured for end-to-end case processing orchestration and state management. Such end-to-end case processing orchestration is triggered by the detection of an event by the event detection module 40.

In addition, system 10 includes a third computing apparatus 70 having a computing platform including a memory and at least one processor in communication with the memory. The third computing apparatus 70 stores, in the memory, Robotic Process Automation (RPA) bots 80 that are executable by the processor and configured to receive a command (i.e., call-out) from the event case processing management module 60 to perform a predetermined robotic task associated with the event case processing and, in response to performing the task, return outputs or otherwise notify the event case processing management module 60 of the completion of the task. Further, the event case processing management module 60, in conjunction with the RPA bot(s) 80 is configured to provide end-to-end monitoring of the case process and dynamic performance indication.

It should be noted that while first, second and third apparatus 30, 50 and 70 are depicted in FIG. 1 as a server or the like, first, second and third apparatus 30, 50 and 70 may comprise one or more (i.e., multiple) of any type of computing device capable of executing the modules and/or bots. Further, while first, second and third apparatus 30, 50 and 70 are depicted in FIG. 1 and described above as separate apparatus, it should be understood that the invention may embody less apparatus (i.e., modules 40 or 60 or bot(s) 80 may be disposed within a same apparatus) without departing from the inventive concepts herein disclosed.

Referring to FIG. 2 a more detailed block diagram is depicted of an apparatus (i.e., third computing apparatus 70) storing RPA bots 80 implemented in event case processing, in accordance with embodiments of the present invention. The apparatus 70 includes a computing platform 72, which may include one or more computing devices. The computing platform 72 includes a memory 74 and at least one processor 76 in communication with the memory 74. Memory 74 may comprise volatile and non-volatile memory, such as read-only and/or random-access memory (RAM and ROM), EPROM, EEPROM, flash cards, or any memory common to computer platforms). Moreover, memory 74 may comprise cloud storage, such as provided by a cloud storage service and/or a cloud connection service.

Further, computing platform 72 also includes processor 76, which may be an application-specific integrated circuit ("ASIC"), or other chipset, logic circuit, or other data processing device. Processor 76 may execute an application programming interface ("API") (not shown in FIG. 2) that interfaces with any resident programs, such as RPA Bots 80 and sub-bots/routines associated therewith or the like stored in the memory 74 of the apparatus 70.

Processor 76 may include various processing subsystems (not shown in FIG. 2) embodied in hardware, firmware, software, and combinations thereof, that enable the functionality of RPA bots 80 and the operability of the RPA bots 80 on a distributed computing network 20 (shown in FIG. 1). For example, processing subsystems allow for initiating and maintaining communications and exchanging data with other networked entities, such as event case processing management module 60 (shown in FIG. 1) and the various databases shown in FIG. 2. For the disclosed aspects, processing subsystems of processor 76 may include any subsystem used in conjunction with RP bots 80 and related sub-bots, routines, algorithms, sub-algorithms, modules, sub-modules thereof.

Computer platform 72 may additionally include a communications module (not shown in FIG. 2) embodied in hardware, firmware, software, and combinations thereof, that enables communications between the RPA bots 80 and other modules, such as event case processing management module 60 (shown in FIG. 1) and the databases (shown in FIG. 2). Thus, communication module may include the requisite hardware, firmware, software and/or combinations thereof for establishing and maintaining a network communication connection.

Memory 74 stores one or more RPA bots 80 that are configured to perform robotic tasks at the command of the event case processing management module 60 (shown in FIG. 1). The bots 80 may include, but are not required to include or limited to include, data-centric bot 82, policy/rules bot 84, procedure bot 86 or other bot 88. The bots 80 are configured to provide tracking data on all tasks performed. Such tracking may be configured to occur in real-time, so as to provide dynamic monitoring of the performance of the related bot. In this regard, the bots 80 provides details on when each task occurred, how long each task took to complete or, real-time visibility, in to how long an ongoing task is taking. Moreover, tracking and monitoring provides data to the event case processing management module 60 that allows the module 60 to assess service level compliance either, post-event case processing and/or dynamically while an event case in being processed.

Data-centric bot 82 is configured to perform robotic tasks related to data functions required of event case processing. For example, data-centric bot 82 may be configured to create or update an event case and, as such, may be in communication with case folder database 90, which is configured to store case folders for each case event. As a means of creating/updating the event case, the data-centric RPA bot 82 may be in communication with entity database(s) 92 that stores data associated with the one or more entities associated with the event. For example, entity databases 92 may include entity profile databases, activity/transaction databases, account databases and the like. Thus, bots 80 may be in communication with recording and monitoring database 104 that is configured to track and record data associated with an event case.

Further, data-centric PPA bot 82 may be employed in researching and resolving an event case. As such, the bot 82 may be configured to extract data from one or more references Websites or other entities with the Internet. For example, data-centric bot 82 may be configured to access URL(s) 94 to retrieve/extract relevant data from a reference Website or the like. Moreover, data-centric bot 82 may be configured to search internal master data systems, such as systems of records associated with activities/transactions, accounts and the like to obtain data relevant to researching and resolving the event case.

In addition, RPA bots 80 may include policy/rules RPA bot 84 that is configured to determine which rules and policies apply to a specific type of event and/or case and insure that the determined rules and policies are adhered to while researching and/or resolving the event case. In this regard, the policy/rules RPA bot 84 is configured to communicate with rules database 98 and regulations and policies database 100 to determine rules and/or regulation/policies applicable to the event. Rules database 98 stores rules applicable to the entity, applicable to the party and/or a segment of the party performing the event case processing (i.e., organization or segment of the organization). Regulations and policies database 100 stores regulations and policies mandated by third party entities, such as local, state or federal government regulations and/or policies or jurisdiction-based policies. Once the rules and/or regulations and policies have been identified, the bot 84 works in conjunction with the data-centric RPA bot 82 and other bots 88 to insure that the data is collected in a manner that adheres to the rules and/or regulations and policies.

Moreover, RPA bots 80 may include procedure RPA bot 86 that is configured to determine the procedure for the event case processing based on the type of event and/or case and insure that the bots 80 and the event case processing management module 60 adhere to the procedure. In this regard, the procedure RPA bot is configured to communicate with procedure database 102 to determine the procedure. Once the rules and/or regulations and policies have been identified, the bot 84 works in conjunction with the data-centric RPA bot 82 and other bots 88 to insure that the bots adhere to the procedure.

Referring to FIG. 3 a high-level flow diagram is provided of the overall process 200 for event case management, in which both an event case processing management module and RPA bots are used in unison, in accordance with embodiments of the present invention. At Event 210, an event is detected or, otherwise ingested. Detection may comprise, in specific embodiments of the invention, implementing predetermined detection rules to scan, on a continuous basis or at regular intervals, systems of record for specified events that meet the criteria of the rules. In specific embodiments of the invention, the systems of record, may be activity/transaction records, account records and the like. In such embodiments, the systems of records may be scanned for an abnormal line item within the records that defines an event (e.g., suspicious activity or the like, which prompts the need for further investigation (i.e., a "case") to determine if the suspicious activity warrants further action (e.g., reporting to internal entities, third-party authorities, government agencies or the like). The event is associated with one or more entities, which may comprise an individual, group of individuals, such as a business unit/company or the like.

At Event 220, in response to detecting an event and verifying that the event requires further investigation, an event case is setup/initiated or a determination is made that a case already exists that is related to the event (e.g., a case related to the same entity or a case related to similar or associated events). In response to determining that a case already exists, the case is updated with information related to the newly detected event.

At Event 230, the event case is routed to predetermined entities. In accordance with embodiments of the invention, the entities may be RPA bots implemented to conduct predetermined case-related events or the entities may be one or more analysts assigned to process the event case.

At Event 240, the event case is resolved in accordance with procedures, rules, policies and the like that are identified as being associated with the case based on the type of event and/or the type of case. In accordance with embodiments of the present invention, the event case is resolved via a series of actions/tasks conducted by the RPA bots and conducted in either an automated or semi-automated manner (i.e., analyst-assisted) via the event case processing management module, previously discussed.

Referring to FIGS. 4 and 5 shown is a more detailed flow diagram of a specific method 300 for event case management, in which both an event case processing management module and RPA bots are used in unison, in accordance with embodiments of the present invention. It should be noted that the methodology described in relation to FIGS. 4 and 5 is specific to one embodiment of the present invention (i.e., a specific event/case type). As such the reader should appreciate that other methodologies for using event case processing management and RPA bots in unison to process event cases are also feasible and within the purview of the present invention.

Referring to FIG. 4, at Start 302, the process is triggered by the detection of an event that warrants further investigation (i.e., a case). As previously discussed, detection may include implementing predetermined detection rules to scan, on a continuous basis or at regular intervals (e.g., daily), systems of record for specified events that meet the criteria of the rules. In specific embodiments of the invention, in which the event is a suspicious activity/item within a system of record, the systems of records may be, but are not limited to, activity/transaction records, account records or the like. In such embodiments, the systems of records may be scanned by applying the predetermined event rules to the records to identify items within the records that meet the criteria defined by the rules.

At Event 304, in response to detecting an event that warrants further investigation, event case processing is initiated within the event case processing management model 60 and, at Decision 306, a determination is made as to whether a related case, currently pending, exists. Such determination may, in certain embodiments of the invention, be conducted in a fully automated or semi-automated manner. Determination of a related case may include matching one or more entities associated with the event to entities currently having cases pending and/or matching attributes of the event (i.e., type of event, date/time of the event, and the like) to attributes of currently pending events.

At Event 308, if a determination is made that no event case currently exists, the event case processing management module 60 sends a command to a RPA bot 80 to create an event case (i.e., a work management folder/file is created for the case with documents/forms having relevant information fields being populated from entity profile data retrieved from entity profile database(s) and other entity-related data retrieved from account databases, activity/transaction databases and the like). In addition, at Event 310, creation of the event case requires upload of documents associated with the event case. Such documents may include, but are not limited to, entity activity/transaction records uploaded from transaction databases, account records, such as credit account records uploaded from account databases, entity profile information, such as proof of residence, proof of identity documents or the like uploaded from the entity profile database(s) and the like. At Event 314, once an event case has been created, the event case is assigned to a user (e.g., an analyst having expertise in the type of event case being processed).

At Event 312, if a determination is made that a related event case exists, the event case processing management module 60 sends a command to a RPA bot 80 to update the existing event case (i.e., the folder/file is accessed and relevant information associated with the event and/or the entities associated with the event are added to the folder/file). In addition, at Event 310, updating of the event case may require upload of documents associated with the event case. Such documents may include, but are not limited to, entity activity/transaction records uploaded from transaction databases, account records, such as credit account records uploaded from account databases, entity profile information, such as proof of residence, proof of identity documents or the like uploaded from the entity profile database(s) and the like. In certain instances, the updating of the event case, may prompt the need to re-assign the event case to a new and/or additional user (not depicted in FIG. 4), such as when the updating of the event case changes the type and/or priority of the event case or the like.

At Event 316, the event case is researched and resolved. Such researching and resolving of the event case may involve both the event case processing management module 60 (with inputs received from the assigned user) and the RPA bots 80 working in unison. At Event 318, the event case processing management module 60 sends a command to a RPA bot 80 to extract data from the Internet, specific Websites/URLs or the like related to the event, the entities associated with the entity (e.g., missing or confirmation of profile data or the like) for the purpose of researching the event case. At Event 320, the event case processing management module 60 sends a command to a RPA bot 80 to conduct a search of the master data systems internal to the user to collect further data related to the event and/or the entities associated with the event, as well as, identifying other entities affected by the event case. The master data system includes all data stored as a reference including activity/transaction data, account data and the like. In specific embodiments of the invention, the extraction of data from the Internet (Event 318) may rely on information searched and retrieved from the master data systems and the searching of the master data systems (Event 320) may rely on information extracted from the Internet/Websites.

At Event 322, the event case processing management module 60 sends a command to a RPA bot 80 to complete an event case resolution checklist based on rules and/or policies associated with the type of event and/or entities associated with the event. The rules and policies may be jurisdiction-specific rules and policies that are applied based on where the event occurred and/or where the entities associated with the event reside. In specific embodiments of the invention, the checklist is completed using information provided by the extraction of data from the Internet/Website (Event 318) and/or the searching of data from the master data systems (Event 320). Completion of the checklist effectively resolves the event case.

Once the event case has been researched and resolved, at Event 324, the event case processing management module 60 reviews and verifies the data. Such reviewing and verifying the data may occur in an automated or semi-automated manner, in which the assigned user/analyst performs or assists in the reviewing and verifying of the data.

Referring to FIG. 5, at Decision 326, the event case processing management module 60 determines whether the resolution of the case is valid. According to specific embodiments of the invention, the validation may occur in an automated or semi-automated manner, in which the assigned user/analyst performs or assists in the validating the resolution of the event case.

If the resolution of the event case is determined to not be valid, at Event 328, the event case processing management module 60 sends a command to a RPA bot 80 to update all systems of record to reflect that the resolution is invalid and include information obtained during the research and resolution process. At Event 332, the process of updating the systems of record may include uploading and ingesting documents (e.g., the event case checklist or the like) and/or returning the document ID from the file network for inclusion of the document or the document ID within the systems of record.

At Event 330, the event case processing management module 60 sends a command to a RPA bot 80 to communicate, such as via electronic mail or the like, to the parties of interest (e.g., the user/analyst of other entities within the organization and the like) a communication to notify the parties of that the resolution is invalid. In specific embodiments of the invention, generating and communicating the email may include, at Event 332, uploading documents for attachment to the emails (e.g., the event case checklist or the like) and/or returning the document ID from the file network for inclusion of the document ID within the email communication.

In specific embodiments of the invention (not shown in the flow of FIGS. 4 and 5), determination that the resolution is invalid may trigger further research and/or resolution and/or verification to insure that the resolution is valid.

If the resolution of the event case is determined to be valid, at Event 336, the event case processing management module 60, updates the event case and, at Event 338, the event case processing management module 60 sends a command to a RPA bot 80 to update all systems of record to reflect that the resolution is valid and include information obtained during the research and resolution process. At Event 332, the process of updating the systems of record may include uploading and ingesting documents (e.g., the event case checklist or the like) and/or returning the document ID from the file network for inclusion of the document or the document ID within the systems of record.

At Event 334, the event case processing management module 60 sends a command to a RPA bot 80 to save the static data and communicate, such as via electronic mail or the like, to the parties of interest (e.g., the user/analyst of other entities within the organization and the like) a communication to notify the parties of that the resolution is valid. In specific embodiments of the invention, generating and communicating the email may include, at Event 332, uploading documents for attachment to the emails (e.g., the event case checklist or the like) and/or returning the document ID from the file network for inclusion of the document ID within email.

At Event 340, in response to updating the event case (Event 336) or triggering communication (Event 340), service levels associated with the event case are determined/reviewed and reports generated and communicated to parties of interest and/or downloaded to report databases. In response to review of the service levels and reports (Event 340) or saving the static data and triggering communication to parties of interest (Event 334), at End 342, the overall event case processing is completed.

Referring to FIG. 6 a flow diagram is presented of a method 400 for event case management, in which both an event case processing management module and RPA bots are used in unison, in accordance with embodiments of the present invention. At Event 410, events associated with first entities (e.g., customers, associates, third-parties or the like) are detected based on predetermined event detection rules. In specific embodiments of the invention, detection may include implementing predetermined event detection rules to scan, on a continuous basis or at regular intervals (e.g., daily), systems of record for specified events that meet the criteria of the rules. In specific embodiments of the invention, in which the event is a suspicious activity/item within a system of record, the systems of records may be, but are not limited to, activity/transaction records, account records or the like. In such embodiments, the systems of records may be scanned by applying the predetermined event rules to the records to identify items within the records that meet the criteria defined by the rules.

At Event 420, orchestration of processing and management of state of an event case, as conducted by an event case processing management module, is triggered in response to detection of the event.

At Event 430, robotic processing automation (RPA) bots receive commands from the event case processing management module to perform one or more tasks associated with the processing of the event cases. The tasks may include data-centric tasks, such as uploading, downloading data, extracting data from the Internet, searching and retrieving data from internal master data systems, completing event case process checklists and the like. Additionally, the tasks may include determining/identifying procedure, rules, regulation and/or policies associated with the event, event case and/or entities associated with the case and insuring that the procedures, rules, regulations and/or policies are adhered to during other robotic tasks (e.g., data-centric tasks or the like).

At optional Event 440, end-to-end monitoring and performance indication of the processing of the event cases is provided, in unison, by the event case processing management module and the RPA bots. In specific embodiments of the invention, such end-to-end monitoring may include, at sub-Event 442 tracking and recording all actions performed by the RPA bots, including, but not limited to, at sub-Event 444, tracking and recording times for completing a task and/or dynamically monitoring the current time for an ongoing task. As such, the present invention, provides real-time visibility, through the event case processing management module, to current case status, including tasks completed, time for completing completed tasks, tasks currently ongoing and the current time undertaken for an ongoing task. In addition, at sub-Event 446, such end-to-end performance indication may provide for assessing service level agreement performance for a task or the overall event case processing, dynamically, in real-time, while processing of the event case is ongoing.

Thus, as described above, embodiments of the present invention provide for processing event cases through the use of a RPA bot model in conjunction with an event case processing management module. Such a synergistic framework provides for greater overall efficiency and improved turnaround time. In addition, by implementing robotic processing in combination with an event case processing management model, the present invention provides the capability for end-to-end monitoring and tracking of event case processing performance.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for event case processing, the system comprising:
   a first computing apparatus comprising a first computing platform having a first memory and at least one first processor in communication with the memory;
   an event detection module stored in the first memory, executable by the first processor and configured to implement predetermined event rules to detect events associated with first entities, wherein the event are anomalies within systems of record;
   a second computing apparatus comprising a second computing platform having a second memory and at least one second processor;
   an event case processing management module stored in the second memory, executable by the second processor and triggered by detection of the events by the event detection module, to process orchestration and state management of event cases;
   a third computing apparatus comprising a third computing platform having a third memory and a plurality of Robotic Process Automation (RPA) bots including a data-centric RPA bot, a policy and rules validation RPA bot and a procedure RPA bot stored in the third memory, executable by the third processor and configured to receive an input command from the event case processing management module, perform predetermined robotic tasks in response to the input commands, and return outputs to the event case processing management module in response to performing the predetermined robotic tasks, wherein the event case processing management module and one or more of the RPA bots are configured to, in unison, provide end-to-end monitoring and performance indication of the processing of the event case, wherein the predetermined robotic task for (i) the data-centric RPA bot is capturing data and uploading data associated with the event cases, (ii) the policy and rules RPA bot is determining one or more policies or rules to apply to the processing of the event cases based on a type of the event and insuring that processing of the event cases adhere to the one or more policies or rules, and (iii) the procedure RPA bot is determining procedures associated with the processing of the event based on the type of the event and insuring that processing of the event cases adhere to the procedures.

2. The system of claim 1, wherein the end-to-end monitoring includes tracking and recording all actions performed by the RPA bots.

3. The system of claim 1, wherein the end-to-end monitoring includes tracking and monitoring times for each individual task included in the processing of the event cases.

4. The system of claim 1, wherein the end-to-end performance indication includes assessing predetermined service level performance on an ongoing basis during the processing of the event cases.

5. The system of claim 1, wherein the event case processing management module is further configured to provide real-time visibility to a status of the processing of the event cases.

6. The system of claim 1, wherein the event is further defined as suspicious activity within a system of record associated with the first entities.

7. A computer program product for event case processing, the computer program product comprising at least one non-transitory computer readable medium having computer-readable program code portions embodied therein, the computer-readable program code portions comprising:

an executable portion for detecting events associated with first entities by implementing predetermined event detection rules, wherein the events are anomalies within systems of records;

an executable portion, triggered by detection of the events, for processing orchestration and state management of events cases;

an executable portion, configured to receive an input command for performing a plurality of predetermined robotic tasks associated with processing the event, perform the predetermined robotic tasks in response to the input commands, and return outputs in response to performing the predetermined robotic tasks, wherein the robotic tasks are performed by a plurality of Robotic Process Automation (RPA) bots including a data-centric RPA bot, a policy and rules validation RPA bot and a procedure RPA bot, and wherein the predetermined robotic tasks for (i) the data-centric RPA bot is capturing data and uploading data associated with the event cases, (ii) the policy and rules RPA bot is determining one or more policies or rules to apply to the processing of the event cases based on a type of the event and insuring that processing of the event cases adhere to the one or more policies or rules, and (iii) the procedure RPA bot is determining procedures associated with the processing of the event based on the type of the event and insuring that processing of the event cases adhere to the procedures; and an executable portion for executing one or more of the plurality of RPA bots to provide, in unison, end-to-end monitoring and performance indication of the processing of the event case.

8. The computer program product according to claim 7, wherein the executable portion for providing end-to-end monitoring and performance further includes a portion for tracking and recording all actions performed by the RPA bots.

9. The computer program product according to claim 7, wherein the executable portion for providing end-to-end monitoring and performance further includes a portion for tracking and monitoring times for each individual task included in the processing of the event cases.

10. The computer program product according to claim 7, wherein the executable portion for providing end-to-end monitoring and performance further includes a portion for assessing predetermined service level performance on an ongoing basis dynamically during the processing of the event cases.

11. The computer program product of claim 7, further comprising an executable portion for providing real-time visibility to a status of the processing of the event cases.

12. The computer program product of claim 7, wherein the events are further defined as suspicious activity within a system of record associated with the first entities.

13. A computer-implemented method for event case processing, the method comprising:

detecting events associated with first entities by implementing predetermined event detection rules, wherein the events are anomalies within systems of record;

triggering, based on the detection of the events, processing orchestration and state management of event cases;

receiving an input command for commanding a plurality of Robotic Process Automation (RPA) bots, including a data-centric RPA bot, a policy and rules validation RPA bot and a procedure RPA bot to perform one or more predetermined robotic tasks associated with processing the event cases and return outputs in response to performing the predetermined robotic tasks, wherein the predetermined robotic tasks for (i) the data-centric RPA bot capturing data and uploading data associated with the event cases, (ii) the policy and rules validation RPA bot determining one or more policies or rules to apply to the processing of the event cases based on a type of the event and insuring that processing of the event cases adhere to the one or more policies or rules, and (iii) the procedure RPA bot determining procedures associated with the processing of the event based on the type of the event and insuring that processing of the event cases adhere to the procedures; and providing end-to-end monitoring and performance indication of the processing of the events cases.

14. The computer-implemented method according to claim 13, wherein providing end-to-end monitoring and performance indication of the processing of the events further comprises tracking and recording all actions performed by the RPA bots and tracking and monitoring times for each individual task included in the processing of the event cases.

15. The computer-implemented method according to claim 13, wherein providing end-to-end monitoring and performance indication of the processing of the events further comprises assessing predetermined service level performance on an ongoing basis dynamically during the processing of the event cases.

16. The computer-implemented method of claim 13, further comprising providing real-time visibility to a status of the processing of the event cases.

17. The computer-implemented method of claim 13, wherein the events are further defined as suspicious activity within a system of record associated with the first entities.

* * * * *